US010458622B2

(12) United States Patent
Nakamura

(10) Patent No.: US 10,458,622 B2
(45) Date of Patent: Oct. 29, 2019

(54) POLYGONALLY-SHAPED REFLECTION MEMBER HAVING INCLINED VERTEX PORTIONS FOR REFLECTING LIGHT FROM A LIGHT SOURCE

(71) Applicant: Enplas Corporation, Kawaguchi-shi, Saitama (JP)

(72) Inventor: Kakeru Nakamura, Kawaguchi (JP)

(73) Assignee: Enplas Corporation, Kawaguchi-shi, Saitama (JP)

( * ) Notice: Subject to any disclaimer, the term of this patent is extended or adjusted under 35 U.S.C. 154(b) by 8 days.

(21) Appl. No.: 15/534,096

(22) PCT Filed: Oct. 20, 2015

(86) PCT No.: PCT/JP2015/079507
§ 371 (c)(1),
(2) Date: Jun. 8, 2017

(87) PCT Pub. No.: WO2016/098439
PCT Pub. Date: Jun. 23, 2016

(65) Prior Publication Data
US 2017/0343187 A1  Nov. 30, 2017

(30) Foreign Application Priority Data
Dec. 16, 2014 (JP) ................. 2014-254479

(51) Int. Cl.
*F21V 7/04* (2006.01)
*F21V 7/00* (2006.01)
(Continued)

(52) U.S. Cl.
CPC .................. *F21V 7/04* (2013.01); *F21V 3/00* (2013.01); *F21V 7/00* (2013.01); *F21V 7/0083* (2013.01);
(Continued)

(58) Field of Classification Search
CPC .. F21V 7/0083; F21V 7/0066; F21Y 2105/10; F21Y 2105/16; F21K 9/68
See application file for complete search history.

(56) References Cited

U.S. PATENT DOCUMENTS 3,539,801 A * 11/1970 Bobrick .................... F21S 8/04
362/240
4,593,485 A * 6/1986 Thillays ................ F21V 7/0083
40/452
(Continued)

FOREIGN PATENT DOCUMENTS

JP    1992-253101    9/1992
JP    1993-011343    1/1993
(Continued)

OTHER PUBLICATIONS

International Search Report PCT/JP2015/079507 (WO 2016/098439) (2016) (4 pages).
(Continued)

*Primary Examiner* — Ismael Negron
(74) *Attorney, Agent, or Firm* — William C. Schrot; AuerbachSchrot LLC

(57) ABSTRACT

A reflection member includes at least one polygonal cell having a polygonally-shaped center bottom part in which a light source is disposed, vertex-part inclined surfaces provided so as to correspond to the respective vertexes of the polygonal shape, and side-part inclined surfaces provided between the corresponding vertex-part inclined surfaces, such that an inclination angle α of at least a part of the vertex-part inclined surfaces to the center bottom part is larger than an inclination angle β of the side-part inclined surfaces to the center bottom part.

18 Claims, 17 Drawing Sheets

(51) Int. Cl.
*G02F 1/1335* (2006.01)
*F21V 3/00* (2015.01)
*G09F 13/04* (2006.01)
*G02B 19/00* (2006.01)
*G02B 5/09* (2006.01)
*F21Y 105/16* (2016.01)
*F21Y 115/10* (2016.01)

(52) U.S. Cl.
CPC ............ *G02B 5/09* (2013.01); *G02B 19/0066* (2013.01); *G02F 1/133603* (2013.01); *G02F 1/133605* (2013.01); *G09F 13/04* (2013.01); *F21Y 2105/16* (2016.08); *F21Y 2115/10* (2016.08)

(56) References Cited

U.S. PATENT DOCUMENTS

| | | | |
|---|---|---|---|
| 5,171,082 A | 12/1992 | Watanabe | |
| 7,950,830 B2* | 5/2011 | Kosters | F21V 7/09 362/296.01 |
| 8,721,115 B2* | 5/2014 | Ing | G09F 13/14 362/241 |
| 8,789,959 B2* | 7/2014 | Shimizu | H04N 5/64 362/612 |
| 9,234,644 B2* | 1/2016 | Ebner | F21V 5/007 |
| 9,341,766 B2* | 5/2016 | Shimizu | G02B 6/0091 |
| 9,874,322 B2* | 1/2018 | Edmond | F21S 8/026 |
| 10,014,435 B2* | 7/2018 | Kim | H01L 33/005 |
| 2005/0138852 A1* | 6/2005 | Yamauchi | F21V 7/10 40/582 |
| 2009/0046468 A1* | 2/2009 | Wang | F21V 7/09 362/297 |
| 2009/0116220 A1 | 5/2009 | Koster | |
| 2009/0273735 A1* | 11/2009 | Yeh | G02F 1/133603 349/67 |
| 2010/0103670 A1* | 4/2010 | Hsu | F21V 7/041 362/235 |
| 2012/0250308 A1 | 10/2012 | Zwak et al. | |
| 2013/0148035 A1 | 6/2013 | Shimizu | |

FOREIGN PATENT DOCUMENTS

| | | |
|---|---|---|
| JP | 2003-050390 | 2/2003 |
| JP | 2004-006317 | 1/2004 |
| JP | 2009-533815 | 9/2009 |
| JP | 2012-029601 | 3/2012 |
| JP | 2012-212673 | 11/2012 |
| JP | 2012-220815 | 11/2012 |

OTHER PUBLICATIONS

Written Opinion of the International Searching Authority PCT/JP2015/079507 (WO 2016/098439) (2016) (10 pages).

* cited by examiner

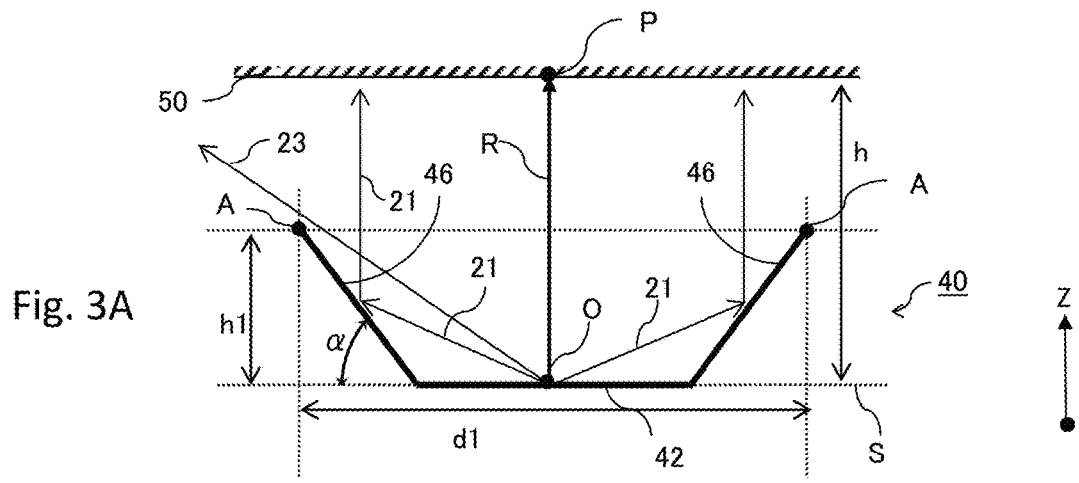
Fig. 3A    Cross-sectional view along the L1 direction
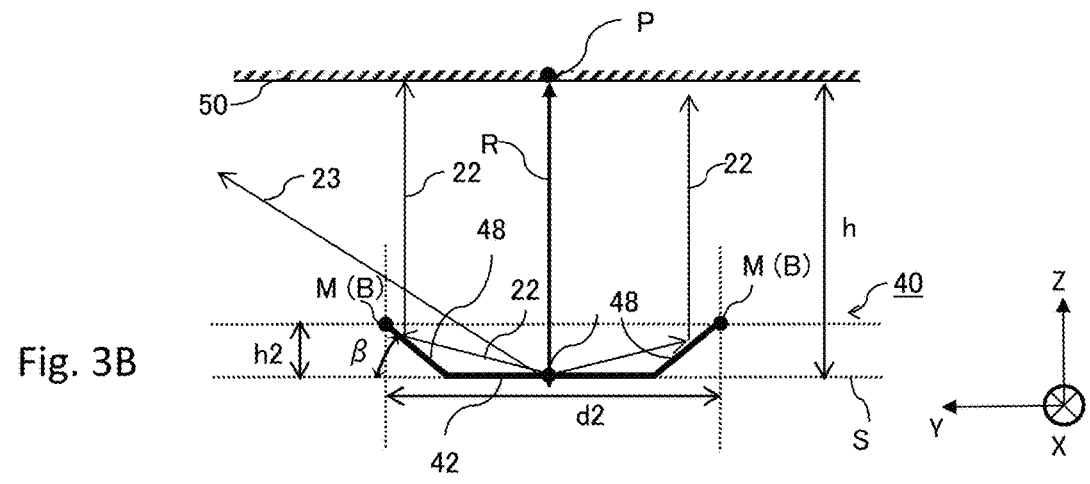
Fig. 3B    Cross-sectional view along the L2 direction

Fig. 15

|  | All lights ON | Zigzag 4 lights ON |
|---|---|---|
| Illumination Device [Fig. 10 (A)] | | |
| Illumination Device [Fig. 10 (B)] | | |

POLYGONALLY-SHAPED REFLECTION MEMBER HAVING INCLINED VERTEX PORTIONS FOR REFLECTING LIGHT FROM A LIGHT SOURCE

CROSS REFERENCE TO RELATED APPLICATIONS AND CLAIM TO PRIORITY

This Application is a national stage application of International Application No. PCT/JP2015/079507, filed Oct. 20, 2015, which claims priority to Japanese Application No. JP2014-254479, filed Dec. 16, 2014, which applications are herein incorporated by reference in their entireties and to which priority is claimed.

TECHNICAL FIELD

The present invention relates to illumination techniques, and in particular relates to a reflection member that receives light from a light source and forms an irradiated area having a substantially polygonal shape in an irradiated plane, and an illumination device, a surface light source device, a display device, electronic equipment and the like using the same.

BACKGROUND ART

A surface light source device has been known in which a plurality alight emitting diodes (LEDs) is arranged in a matrix manner. The surface light source device is used as, for example, illumination means (back light) of a liquid crystal display device, and illuminates a liquid crystal display panel from its back-surface side in a planar manner.

In such a surface light source device (direct type in which LEDs are arrayed on the back-surface side of a liquid crystal display panel), a technique of local dimming (area-by-area light-adjustment control) has been known that improves contrast ratio between different divided areas in the same screen or reduces power consumption by separately controlling light intensity of the LEDs.

As a surface light source device that enables local dimming control, an illuminator capable of illuminating a desired portion of a translucent light diffusion sheet with a clear outline has been proposed (e.g., see Patent Literature 1). The illuminator described in Patent Literature 1 is used in a liquid crystal display device, an illumination device and the like, includes a light reflecting member, a translucent light diffusion sheet, and light sources, and is supposed to be able to suppress interference of light emitted from the light sources arranged in respective recesses adjacent to each other on the light reflecting member.

As a surface light source device, an illumination device has also been known that reflects light from a light source by a concave mirror to irradiate a liquid crystal display panel with the light (e.g., see Patent Literature 2). According to the illumination device described in Patent Literature 2, it is supposed that independent luminance control for each divided area is possible, and that the shape of the light flux can be made to be a substantially square shape similar to the shape of the divided areas.

CITATION LIST

Patent Literature

Patent Literature 1: Japanese Unexamined Patent Publication No. 2011-90949

Patent Literature 2: Japanese Unexamined Patent Publication No. 2010-205698

SUMMARY OF INVENTION

Technical Problem

The illuminator (see FIG. 19) described in Patent Literature 1 is composed of: a light reflecting member A in which a number of recesses 2 of an inverted truncated quadrangular pyramid shape are arranged lengthwise and crosswise on a thermoplastic resin; a light source disposed at a bottom surface portion 21 of the recess 2; and a translucent light diffusion sheet, so as to illuminate a desired portion of the translucent light diffusion sheet with a clear outline.

However, in the configuration of the recess 2 of an inverted truncated quadrangular pyramid shape described in Patent Literature 1, the inclination of a connection portion 22b' of an isosceles triangle along the direction of the diagonal line of the recess 2 having a plan view rectangular shape inevitably becomes gentle as compared with the inclination of a peripheral wall portion 22a. Consequently, the light emitted from the light source provided at the center of the bottom surface portion 21 of the recess 2 toward the connection portion 22b' is reflected at a shallow angle at the inclined surface of the connection portion 22b', so that the light is difficult to reach the translucent light diffusion sheet provided in the front direction of the recess 2 (reflection direction of light). Consequently, in the light reflecting member described in Patent Literature 1, when making the desired portion of the translucent light diffusion sheet to be a rectangular shape is desired, the four corners of the desired portion fail to obtain sufficient brightness. That is, the illuminator of Patent Literature 1 is difficult to obtain an irradiated area having a precise and uniform rectangular shape. Moreover, with reference to examples described in Patent Literature 1, boundaries of a rectangular irradiated area can be viewed, which indicates failure of uniform surface illumination.

In this regard, a concave mirror 41 (see FIG. 20) in the illumination device described in Patent Literature 2 has a plan view square shape, and the curvatures (K3, K4) of the concave portion in the diagonal line directions of the square are set to be smaller than the curvatures (K1, K2) of the concave portion in the horizontal and vertical directions of the square so as to achieve conversion of a light flux of a substantially circle shape into a light flux of a shape similar to a square shape.

However, the illumination device described in Patent Literature 2 presupposes that the light source is arranged on the side of the irradiated plane with respect to the concave mirror 41. Consequently, when making the area of the concave mirror 41 larger is desired, the distance between the light source and the concave mirror 41 needs to be increased, making the illumination device itself thick. Therefore, the illumination device described in Patent Literature 2 is difficult to increase the area of the divided area while keeping its thickness thin so as to reduce the number of light sources to be mounted.

The present invention has been conceived in the light of the above problems, and the object thereof is to provide a reflection member, an illumination device, a surface light source device, a display device, and electronic equipment capable of at least partially solving the above problems.

Solution to Problem

To solve the above problems, a reflection member of the present invention is a reflection member for reflecting light emitted from a light source. The reflection member comprises at least one polygonal cell of a polygonal shape in plan view, and the polygonal cell has: a center bottom portion on which the light source is arranged; and an inclined portion inclined from the center bottom portion toward an outer rim. The inclined portion has a vertex-portion inclined surface provided correspondingly to each vertex of the polygonal shape, and a side-portion inclined surface provided between two of the vertex-portion inclined surfaces. An inclined angle α of at least a part of the vertex-portion inclined surface is larger than an inclined angle β of the side-portion inclined surface in cross-sectional view.

In the reflection member, it is preferable that the highest point of the vertex-portion inclined surface of the polygonal cell be higher than the highest point of the side-portion inclined surface in cross-sectional view. It is also preferable that a plurality of the polygonal cells be included, an outer rim of each of the plurality of the polygonal cells be arranged to be adjacent to each other. Furthermore, it is preferable that the vertex-portion inclined surface have a plane with an inclined angle α.

An illumination device of the present invention is an illumination device comprising a light source and a reflection member for reflecting light emitted from the light source. The reflection member includes at least one polygonal cell of a polygonal shape in plan view, and the polygonal cell has: a center bottom portion on which the light source is arranged; and an inclined portion inclined from the center bottom portion toward an outer rim. The inclined portion has a vertex-portion inclined surface provided correspondingly to each vertex of the polygonal shape, and a side-portion inclined surface provided between two of the vertex-portion inclined surfaces. An inclined angle α of at least a part of the vertex-portion inclined surface is larger than an inclined angle of the side-portion inclined surface in cross-sectional view.

It is preferable that the illumination device comprising a light flux controlling member for controlling the light emitted from the light source to be a light flux of a predetermined distribution state. It is also preferable that the predetermined distribution state have a peak in direction of a predetermined angle from a reference surface, and the predetermined angle be smaller than the inclined angle β of the side-portion inclined surface. Furthermore, it is preferable that the highest point of the vertex-portion inclined surface of the polygonal cell be higher than the highest point of the side-portion inclined surface in cross-sectional view. It is preferable that the reflection member include a plurality of the polygonal cells, and the outer rim of each of the plurality of the polygonal cells be arranged to be adjacent to each other.

A surface light source device of the present invention comprises the illumination device and a diffusion member provided on a light emission side of the illumination device. A display device of the present invention comprises the surface light source device and an illuminated member which is irradiated with the light from the surface light source device. Electronic equipment of the present invention comprises the display device as a display unit.

Advantageous Effects of Invention

According to the reflection member of the present invention, the reflection member can receive the light emitted from the light source or the light emitting device (the light source and the light flux controlling member) so as to form an irradiated area having a substantially polygonal shape on the irradiated plane. The illumination device and the surface light source device of the present invention make it possible to form an irradiated area of a desired polygonal shape. Moreover, the display device of the present invention makes it possible to form a display area of a desired polygonal shape, and enable precise local dimming control. Other effects will be described in Detailed Description.

BRIEF DESCRIPTION OF DRAWINGS

FIG. 3A and FIG. 3B are cross-sectional views along first and second baselines, respectively, of the polygonal cell shown in FIG. 2;

FIG. 15 is a photograph of a light emitting surface of the surface light source device in which a diffusion member is arranged on FIG. 14;

DETAILED DESCRIPTION

Summary of Invention

Figure 1:
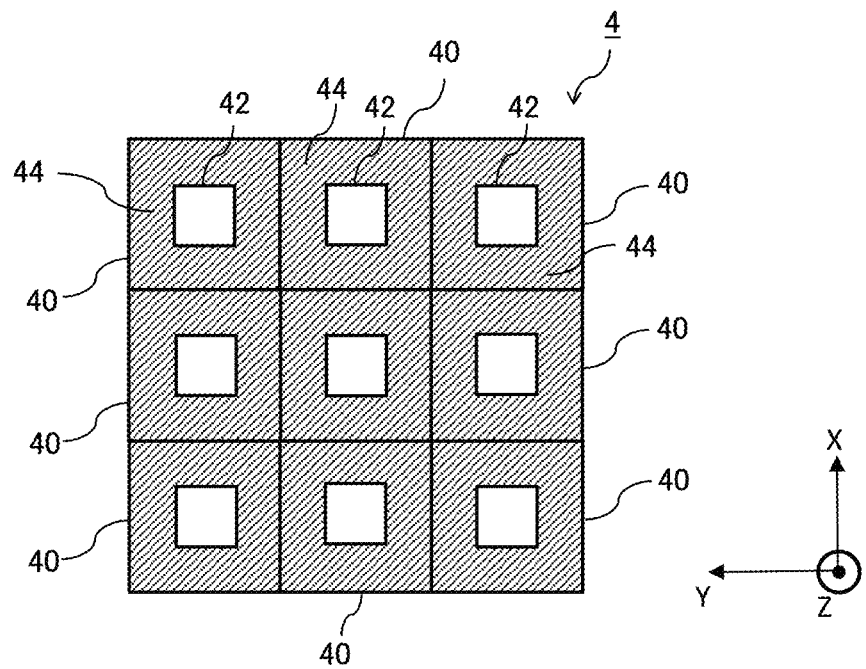
FIG. 1 is a schematic plan view of a reflection member according to an embodiment of the present invention.

[1] A reflection member of the present invention has a polygonal cell for reflecting light emitted from a light source (or a light emitting device including a light source and a light flux controlling member) so as to form an irradiated area of a substantially polygonal form on an irradiated plane. A vertex-portion inclined surface with a large inclined angle is provided correspondingly to each vertex of the polygon so as to increase the intensity of the light on each vertex and form a light flux with a cross section, perpendicular to an optical axis, of a polygonal form corresponding to the polygonal cell, making it possible to enable illumination having high uniformity on the irradiated area.

It is preferable that the reflection member be a thin sheet and be flat as a whole. Herein, provided that dimensions of the reflection member are indicated by length (X axis direction), width (Y axis direction), and height (Z axis direction) (see FIGS. 1 to 3), a plane defined by XY shall be a reference surface (e.g., reference symbol S of FIG. 3). An irradiated plane is any reference plane (e.g., reference symbol 50 of FIG. 3) in the irradiation direction of light reflected by the reflection member, and is used for specifying a shape and area of an irradiated area, a shape of irradiation light, and the like. Furthermore, a view from the side of an irradiated surface in a Z axis direction is called a "plan view", and a view from a direction perpendicular to the Z axis direction is called a "cross-sectional view".

The reflection member of the present invention includes at least one polygonal cell, and the polygonal cell has a polygonal shape (typically a rectangular shape) in plan view, and has a shape with a dimple in cross-sectional view because it has a center bottom portion on which a light source is arranged and an inclined portion around the center bottom portion inclined toward an outer rim. The outer rim of the polygonal cell is composed of each vertex and each side connecting two of the vertices. The outer rim of the polygonal cell is also a portion corresponding to the outline composing the polygonal shape in plan view. It is preferable that center point of the polygonal cell and the center point of the center bottom portion match in plan view, and it is preferable that the optical axis of the light source be arranged at the center point. A reflecting member may be composed of a plurality of polygonal cells (see FIG. 1), or of only one polygonal cell (see FIG. 2).

As the shape of the polygon, various shapes such as triangle, quadrangle, pentagon, and hexagon can be employed (see FIG. 4). Also, it is preferable that the plurality of the polygonal cells are composed of triangle (including equilateral triangle, rectangular triangle, isosceles triangle, etc.), quadrangle (including square, rectangle, parallelogram, etc.), or hexagon (including regular hexagon, parallel hexagon, etc.) because the outer rims of the respective polygonal cells can be arranged adjacent to each other so as to form a plane without gaps. Composing a plurality of rectangular cells enables the reflection member itself to have a rectangular shape, which is more preferable. The polygonal cell may be a substantially regular polygon having sides of almost the same length, or may have a deformed shape having sides of different lengths depending on the purpose and aspects of its usage. Note that each vertex A of the polygon may be composed of two straight lines or may be rounded.

The center bottom portion of the polygonal cell may employ an appropriate shape to form a desired inclined portion, and may employ various shapes in plan view such as triangle, quadrangle, pentagon, and hexagon (see FIG. 4). Also, the center bottom portion may be flat in cross-sectional view, may be inclined, or may include a curved surface in part.

The inclined portion has a vertex-portion inclined surface formed correspondingly to each vertex of the polygonal cell. Although a maximum inclined portion of the vertex-portion inclined surface only needs to be provided on a part of an area between the center point and each vertex of the polygon in plan view, it is preferable that the maximum inclined portion is an area encompassing the vertices of the polygon and the vicinity thereof. Furthermore, this inclined portion has a side-portion inclined surface formed between two of the vertex-portion inclined surfaces, and it is preferable that the side-portion inclined surface includes the side of the polygonal cell and its vicinity (see FIG. 2).

Figure 8:
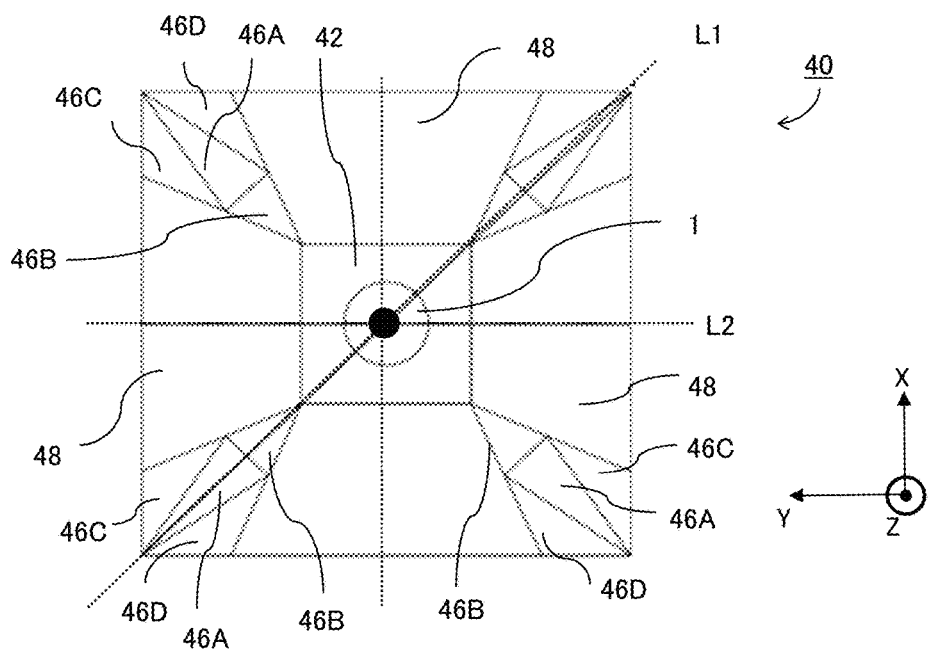
FIG. 8 is an enlarged plan view of the rectangular cell of the surface light source device shown in FIG. 6.

Each of the vertex-portion inclined surface and the side-portion inclined surface may be composed of a single plane, or be configured by combining a plurality of planes. For example, the vertex-portion inclined surface in FIG. 8 is configured by combining a plurality of planes, and the side-portion inclined surface in FIG. 8 is composed of a single plane. Each of them may also include a curved surface in part.

In the reflection member of the present invention, the inclined angle $\alpha$ of the maximum inclined portion of the vertex-portion inclined surface is larger than the inclined angle $\beta$ of the side-portion inclined surface in plan view. The inclined angles of the inclined surfaces are defined with respect to the reference surface. Also, it is preferable that the highest point of the vertex-portion inclined surface be higher than the highest point of the side-portion inclined surface in plan view (see FIG. 3 and FIG. 9).

The reflection member only needs to be made of a material having light reflectivity in a reflection surface that receives the light from the light source, and may be formed by, for example, subjecting a thermoplastic resin sheet to extrusion to give a predetermined shape of the polygonal cell, or may be formed by applying or evaporating a material having reflectivity on the surface of a base on which the polygonal cell of a predetermined shape is preliminarily formed. Furthermore, the surface of the reflection member may have light diffuseness.

[2] An illumination device is a device in which the light source or the light emitting device for radiating light of a predetermined distribution state and the above reflection member are combined, and is a device for, for example, forming an irradiated area of substantially polygonal shape on an irradiated plane by converting a light flux of a substantially circle shape in XY cross section into a light flux of a substantially polygonal shape in XY cross section. The light emitting device is configured with a light source and a light flux controlling member. The illumination device can provide divided areas different in contrast ratio by controlling light intensity of the light source of the individual polygonal cell when the irradiated area has a shape in which a plurality of polygons is combined due to reflection of light from a plurality of polygonal cells. A divided area may be a dark portion where by turning the light source off.

The light source can employ an LED, a bulb, a xenon lamp, a semiconductor laser, an organic EL element, an ultracompact fluorescent lamp, or the like. It is preferable that the light source be arranged at (the center point of) the reflection member such that its optical axis becomes perpendicular to such a plane. The light flux controlling member is arranged with the light source, and controls the light emitted from the light source to be a light flux of a predetermined distribution state.

When an LED is employed as the light source, the LED light source has, unlike normal bulbs, specific directivity. When the LED light source is arranged at the center bottom portion of the reflection member, light of a distribution state having the most intense peak in the optical axis direction (Z axis direction) is emitted from the LED light source 2. Thus, on the irradiated plane, a portion just above the light source is likely to become an intense luminescent spot, which is not preferable in terms of uniform surface emission.

In the present invention, the light emitting device can be used including the light flux controlling member for controlling light from the light source to be a light flux of a light distribution state having a peak in a predetermined angle direction. It is preferable that the light flux controlling member be a lens for controlling the light emitted from the LED to be light of a light distribution state having a peak in a direction of a predetermined angle with respect to the reference surface (not more than 45°, preferably not more than 30°, more preferably not more than the inclined angle β of the side-portion inclined surface). Arrangement of the light emitting device 1 on the reflection member 4 makes it possible to effectively convert a light flux emitted toward the outside at a small angle with respect to the reference surface into a light flux of a substantially polygonal shape to form an irradiated area of a relatively precise polygonal shape on the irradiated plane.

The size of the reflection member, the inclined angle of the vertex-portion inclined surface and the side-portion inclined surface, and the like are appropriately set depending on the light distribution state of the light source or the light emitting device to be arranged and the like, but it is preferable that the predetermined angle in the light distribution state be set to be smaller e inclined angle of the side-portion inclined surface so that most of the light flux emitted from the light source or the light emitting device is applied onto the reflection member 4. The illumination device of the present invention can form an irradiated area of a polygonal shape with a highly uniform brightness.

[3] Further, a surface light source device of the present invention has at least the light source or the light emitting device, the reflection member and a diffusion member. The diffusion member is a cover over the illumination device (the illumination device and the reflection member), and formed by a translucent material. The surface light source device of the present invention can form an irradiated area of a polygonal shape with a highly uniform brightness (for example, on the diffusion member).

The illumination device and the surface light source device of the present invention is applicable to, for example, a back light for a display panel, an illuminated signboard, an internally illuminated sign, and illuminating means, and specifically can be applied when making irradiation with light of a special shape.

Furthermore, a display device of the present invention includes the light source device and an illuminated member which is irradiated with light from the surface light source device. The illuminated member is, for example, a liquid crystal panel, an illuminated signboard, or an internally illuminated sign. The display device of the present invention is capable of local dimming control for each specific irradiated area by the surface light source device, making it possible to display, for example, an obvious black color for each desired divided area of a liquid crystal display panel. Furthermore, the display device of the present invention can form an irradiated area of a polygonal shape with a highly uniform brightness for each divided area on the illumination member (display panel).

Furthermore, electronic equipment of the present invention includes such a display device as a display unit. Examples of the electronic equipment include, although not limited thereto, a mobile phone, a display device for car navigation system, a personal digital assistants (PDA), a mobile computer, a digital camera, a digital video camera, an in-vehicle equipment, an audio equipment, a portable game machine, and a signal.

Hereinafter, examples of the present invention will be described with reference to the drawings. However, the present invention is not limited to the following examples.

[Reflection Member]

FIG. 1 is a schematic plan view of a reflection member 4 of the present invention.

Figure 2:
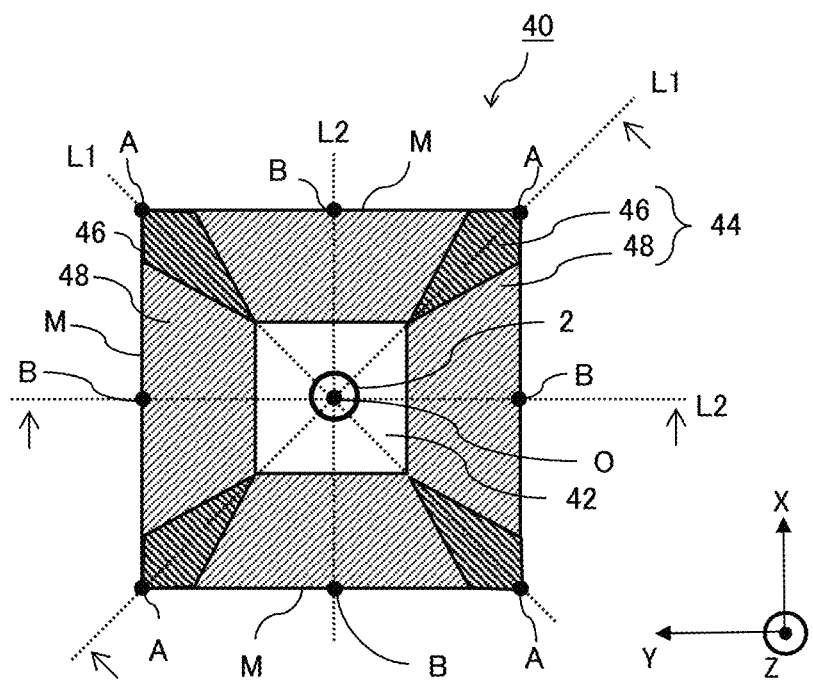
FIG. 2 is a schematic plan view of one polygonal cell of the reflection member shown in FIG. 1.

FIG. 2 is a schematic plan view of one polygonal cell 40 on the reflection member 4 shown in FIG. 1. FIG. 3A is a cross-sectional view of the polygonal cell 40 shown in FIG. 2 along a first baseline L1, and FIG. 3B is a cross-sectional view of the same along a second baseline L2. Note that FIGS. 1 to 3 are only for illustrating the principle, and the dimensions are not limited to those in FIGS. 1 to 3.

As shown in FIGS. 1 to 3, the reflection member 4 comprises a plurality of rectangular cells 40 of a rectangular shape in plan view. The rectangular cells 40 are arranged in a matrix manner so that outer rims of them are adjacent to each other without gaps, and the reflection member 4 itself is also of a rectangular shape in plan view.

Each rectangular cell 40 has: a center bottom portion 42 on which a light source 2 is arranged; and an inclined portion 44 (area indicated by hatching in the drawings) which is inclined from the center bottom portion 42 toward the outer rim. As shown in FIG. 2, the inclined portion 44 is provided with four vertex-portion inclined surfaces 46 corresponding to four vertices A of the rectangular cell 40. In the FIG. 2, the vertex A is included in the vertex-portion inclined surface 46. As shown in FIG. 2, the inclined portion 44 also has a side-portion inclined surface 48 formed between two of the vertex-portion inclined surfaces 46. The light source 2 is arranged at a center point O of the rectangular cell 40 (the center bottom portion 42).

Given that a line connecting the center point O and each vertex A of the rectangular cell 40 is a first baseline L1 (an A-A diagonal line), and a line passing through the center point O of the rectangular cell 40 and dividing a space between adjacent first baselines L1 into two equal portions is a second baseline L2 (a B-B parting line), the vertex-portion inclined surface 46 is inclined such that its height becomes higher toward vertex A along the direction of the first baseline L1, and the side-portion inclined surface 48 is inclined such that its height becomes higher toward the midpoint B of the side M along the direction of the second baseline L2.

Referring to FIGS. 3A and 3B, the width of the rectangular cell 40 in the L1 direction is d1 and the width thereof in the L2 direction is d2, wherein d1>d2. On the other hand, the vertex-portion inclined surface 46 has an inclined angle α with respect to the reference surface S (the center bottom portion 42), and the side-portion inclined surface 48 has an inclined angle with respect to the reference surface S (the center bottom portion 42), wherein α>β.

In FIGS. 1 to 3, the highest point of the vertex-portion inclined surface 46 is the vertex A of the rectangular cell 40 with the height h1 with respect to the reference surface S, and the highest point of the side-portion inclined surface 48 is a side M (corresponding to the point B in a cross section along the L2 direction) with the height h2 with respect to the reference surface. The highest portion of the vertex portion inclined surface 46 is in a position higher than the highest portion of the side-portion inclined surface 48, wherein h1>h2.

Herein, as the rectangular cell of the reflection member, according to a conventional method (e.g., see Patent Literature 1), for example, when a rectangular cell is configured having a dimple of an inverted truncated regular quadrangular pyramid shape, the length of the rectangular cell along the direction of the first baseline (corresponding to a diagonal line) is generally longer than the length thereof along the second baseline (corresponding to a parting line which divides the rectangle vertically and horizontally) in plan view. Thus, the inclined angle along the direction of the first baseline is necessarily smaller than the inclined angle along the direction of the second baseline. Therefore, when a point light source is located at the center point of the rectangular cell and the light is radially emitted from the point light source, the elevation angle range of the light traveling in the direction of the first baseline and reflected by the inclined surface is narrower than the elevation angle range of the light traveling in the direction of the second baseline and reflected by the inclined surface, reducing the rate of reflecting towered the side of an irradiated plane in the direction of the first baseline. In this manner, in the conventional method, brightness of the irradiated area in the irradiated plane fails to be constant, causing a bright portion and a dark portion in some cases. Specifically, the reflection member of the conventional rectangular cell causes dark portions at the four corners of the irradiated area, failing to display a precise rectangular shape.

In this regard, in the reflection member of the present invention, since the vertex-portion inclined surface is formed in the direction of the first baseline and has an inclined angle larger than that of the side-portion inclined surface formed in the direction of the second baseline, a light flux can be formed which has, in a cross section perpendicular to the Z axis (optical axis), a shape similar to the shape of the polygonal cell, making it possible to achieve highly uniform illumination on the irradiated area. Also, according to an aspect of the present invention, since the highest point of the vertex-portion inclined surface is arranged to be higher than the highest point of the side-portion inclined surface, the light can be reflected at the vertex-portion inclined surface even in the case of the light emitted at relatively high elevation angle, so that the light can reach the side of the irradiated plane.

Referring to FIGS. 3A and 3B, a point light source (not shown) is arranged on the center point O of the rectangular cell 40 (the center bottom portion 42) when light is emitted from the point light source around the optical axis R, the light 21 traveling in the direction of the first baseline L1 within a relatively low elevation angle range is reflected by the vertex-portion inclined surface 46 toward a virtual irradiated plane 50 arranged at a height of h from the reference surface, and the light 22 traveling in the direction of the second baseline L2 within a relatively low elevation angle range is reflected by the side-portion inclined surface 48 toward the irradiated plane 50. Also, the light 23 out of such an elevation angle range will travel over an upper end of each inclined surface toward outside of the rectangular cell 40. Taking into account the basic property of reflection of the light by the reflection member, the light distribution property of the light emitted from the light source, and the dimension, the inclined angle and the like of the polygonal cell are designed so as to form a polygonal surface light source for relatively highly uniform illumination on the irradiated surface 50.

In this manner, according to the configuration of the reflection member 4 of the present invention, most of the light emitted from the light source and traveling in the direction of the first baseline can be received at the vertex-portion inclined surface 46 to reflect the light toward the irradiated plane 50. This makes it possible to form an irradiated area of a substantially rectangular shape similar to the shape of the rectangular cell 40 on the irradiated plane 50, making it possible to provide illumination of a relatively precise rectangular shape with no dark points at its four corners.

Figure 4A:
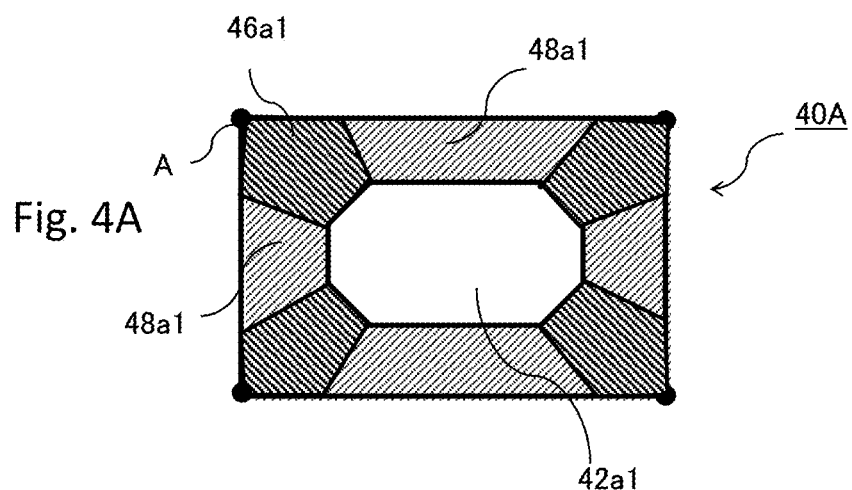
FIG. 4A, FIG. 4B and FIG. 4C show configuration examples of the polygonal cell.
Figure 4B:
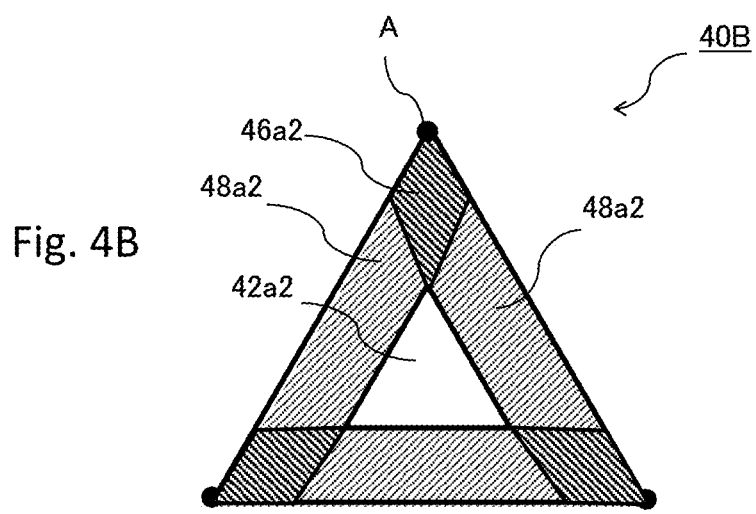
Figure 4C:
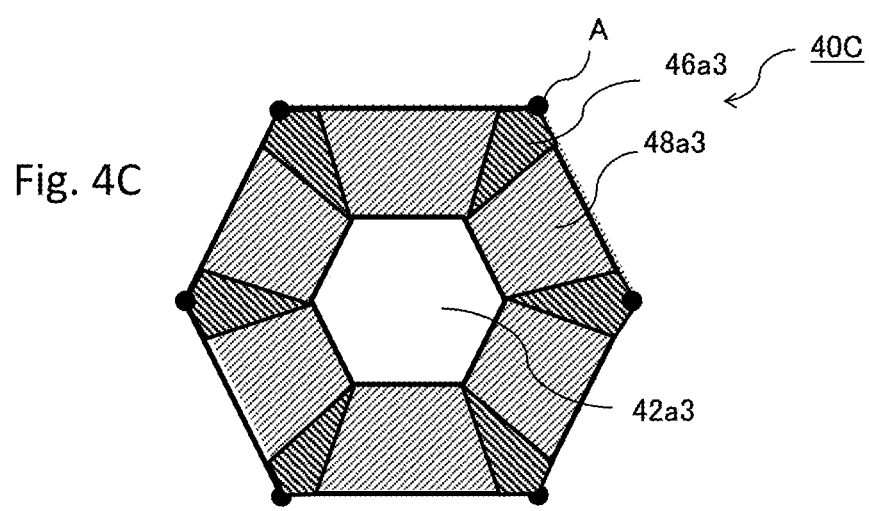
Figure 5A:
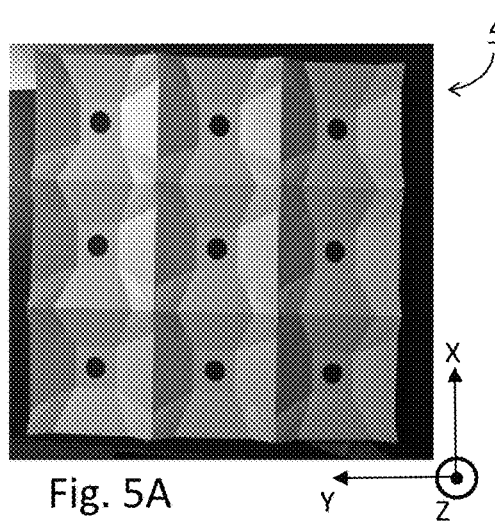
FIG. 5A, FIG. 5B, FIG. 5C and FIG. 5D are photographs of the reflection member and a rectangular cell of the present invention.
Figure 5B:
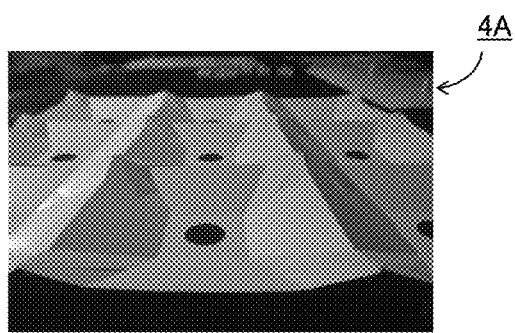
Figure 5C:
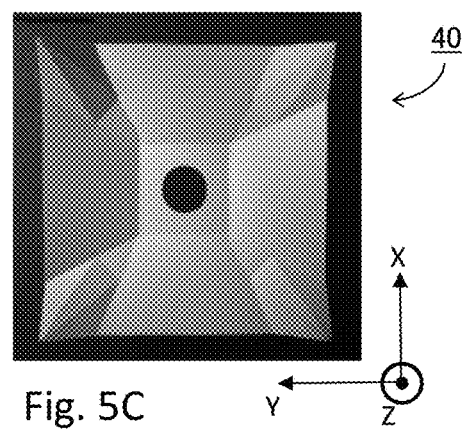
Figure 5D:

Note that, although the above description is about a case in which a rectangular cell (substantially square shape) is formed as the polygonal cell, the configuration of the polygonal cell of the reflection member of the present invention is not limited thereto, and may also be configured as, for example, the cell of rectangle, triangle, or hexagon in plan view as shown in FIGS. 4A to 4C. A rectangular cell 40A shown in FIG. 4A has: around a center bottom portion 42a1 of an oblong octagonal shape, four vertex-portion inclined surface 46a1 of a pentagonal shape in plan view provided correspondingly to four vertices A; and four side-portion inclined surface 48a1 between adjacent two of the vertex-portion inclined surfaces 46a1. A triangular cell 40B shown in FIG. 4B has: around a center bottom portion 42a2 of a triangle shape similar to an outer rim, three vertex-portion inclined surface 46a2 of a substantially rhomboidal shape in plan view provided correspondingly to three vertices A; and three side-portion inclined surface 48a2 between adjacent two of the vertex-portion inclined surfaces 46a2. A hexagonal cell 40C shown in FIG. 4C has: around a center bottom portion 42a3 of a hexagonal shape similar to an outer rim, six vertex-portion inclined surface 46a3 of a kite shape in plan view provided correspondingly to six vertices A; and five side-portion inclined surface 48a3 between adjacent two of the vertex-portion inclined surfaces 46a3.

FIG. 5 is a photograph of an example of a reflection member 4A and a rectangular cell of the present invention. FIG. 5A is a photograph of a prototype of the reflection member 4A taken from the Z-axis direction, and FIG. 5B is a photograph of the same reflection member 4A taken from the perspective direction. FIG. 5C is a photograph of one rectangular cell 40 of the same reflection member 4A taken from the Z-axis direction, and FIG. 5D is a photograph of the same rectangular cell 40 taken from the perspective direction.

[Surface Light Source Device]

Figure 6:
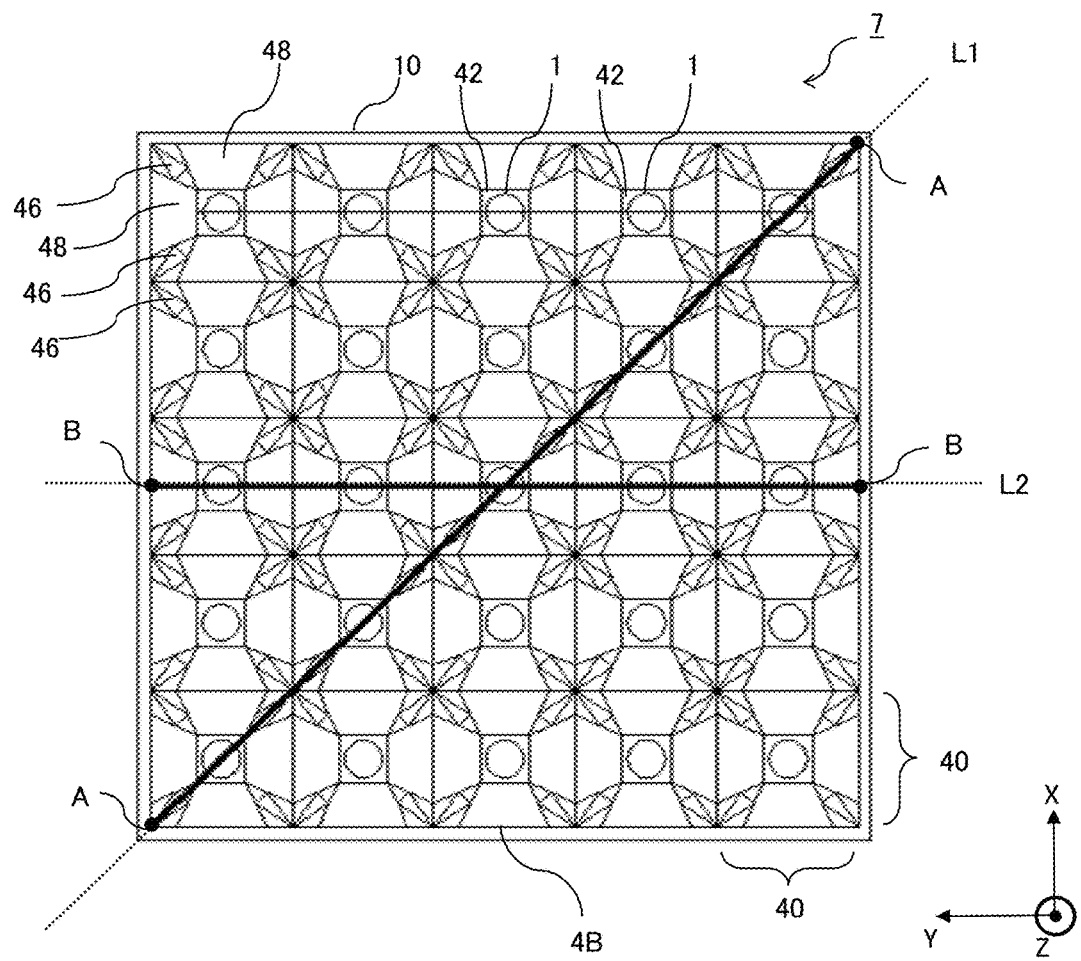
FIG. 6 is a schematic plan view of an example of a surface light source device of the present invention in which a diffusion member is omitted.

FIG. 6 is a schematic plan view of an example of a surface light source device 7 of the present invention. For convenience, a diffusion member on the illumination device is omitted. FIG. 7A is a cross sectional view of the surface light source device 7 shown in FIG. 6 along the first baseline L1, and FIG. 7B is a cross sectional view of the same along the second baseline L2.

Figure 7:
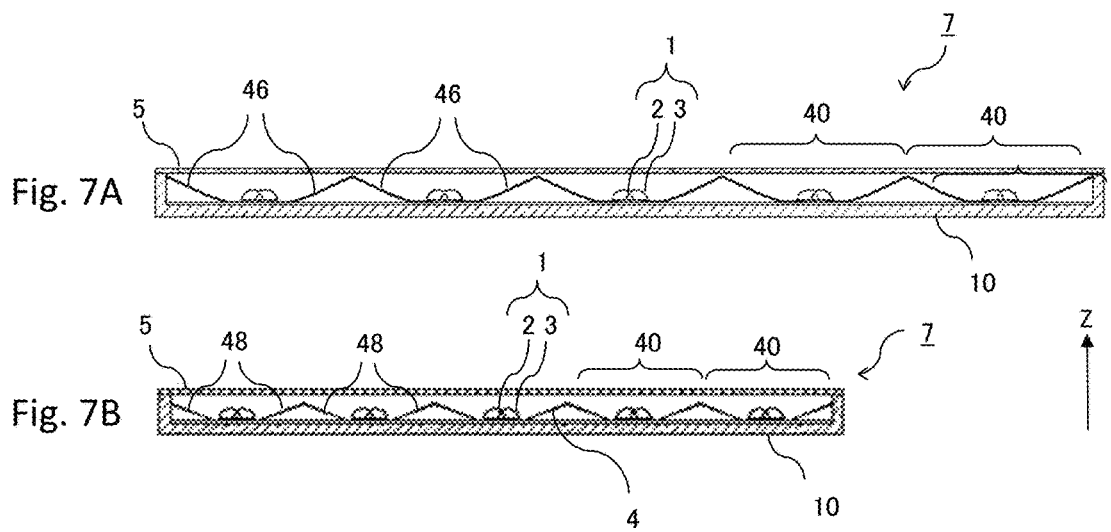
FIG. 7A and FIG. 7B are cross-sectional views along first and second baselines, respectively, of the surface light source device shown in FIG. 6.

As shown in FIGS. 6 and 7, the surface light source device 7 is a device in which, in the reflection member 4B includes the rectangular cells 40 in a matrix of five rows and five columns, light emitting devices 1 in a matrix of five rows and five columns are arranged on a center of each rectangular cell 40. The reflection member 4B including an array of the rectangular cells 40 on which the light emitting devices 1 are arranged is stored in a housing 10, and the diffusion member 5 is provided on the emission side of a light flux (the Z-axis side).

Figure 11:
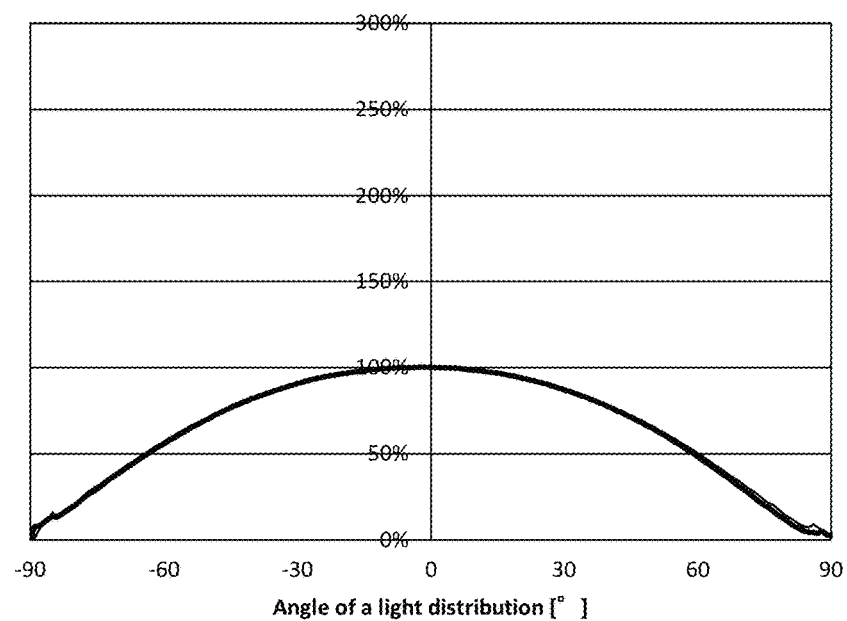
FIG. 11 shows measured values of a light distribution curve of the LED light source used in FIG. 10.
Figure 12:
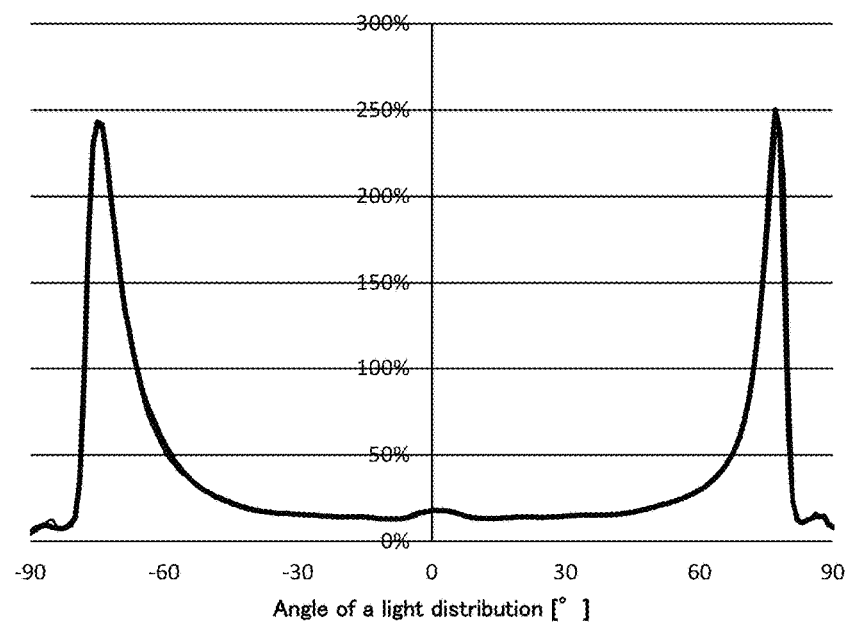
FIG. 12 shows measured values of a light distribution curve of the light emitting device used in FIG. 10.

The light emitting device 1 includes a light source 2 and a light flux controlling member 3. The light source 2 is an LED, and has a light distribution curve as shown in FIG. 11 described below. The light flux controlling member 3 is a lens for controlling light emitted from the light source 2 to be a light flux of a predetermined light distribution state. It can radiate a light flux with a light distribution curve as shown in FIG. 12 described below, and has a peak in 70°-80° from the optical axis (the Z axis) (in 10°-20° from the reference surface (the XY surface)).

The light emitting device 1 as described above radiates a light flux in a direction of a predetermined angle from the reference surface S (in an oblique direction) and there is no strong light intensity on the optical axis. Therefore, no intense luminescent spots appear on a portion just above the light source, making it possible to achieve highly uniform surface light emission.

Also, the distance from the center bottom portion 42 on which the light emitting device 1 is disposed in the reflection member 4 to the diffusion member 5 can be made shorter, which is different from conventional methods (e.g., see Patent Literature 2a), making it possible to provide a thin surface light source device. Furthermore, the area of the rectangular cell can be made relatively larger, making it possible to configure a surface light source device having a large area with a small number of mounted light sources (LEDs). Furthermore, the light emitted from adjacent rectangular cells does not overlap in an irradiated plane, making it possible to control luminance for each divided area in the irradiated plane.

Figure 9A:
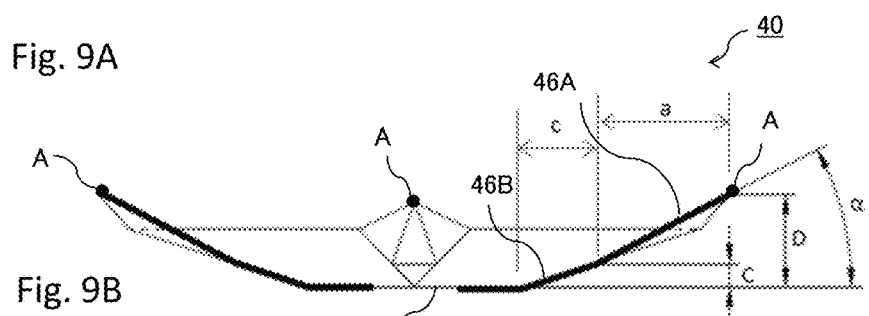
FIG. 9A and FIG. 9B are schematic cross-sectional views along first and second baselines, respectively, of the rectangular cell shown in FIG. 8.
Figure 9B:
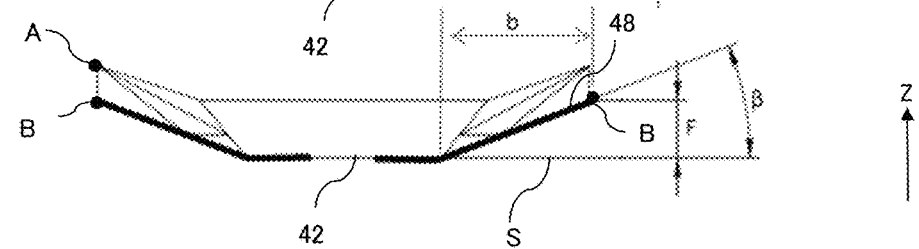

FIG. 8 is an enlarged plan view of the rectangular cell 40 on the surface light source device 7 shown in FIG. 6. FIG. 9A is a cross sectional view of the rectangular cell shown in FIG. 8 along the first baseline L1, and FIG. 9B is a cross sectional view thereof along the second baseline L2.

As shown in FIGS. 8 and 9, a vertex-portion inclined surface 46 of the rectangular cell 40 of this example is sterically configured by combining four plane areas (triangular segments), and at least one area (segment including a vertex and a vicinity thereof) 46A has an inclined angle α larger than that of a side-portion inclined surface 48. The other triangular segments 46B, 46C and 46D are essential elements for connecting the area 46A of the inclined angle α to the side-portion inclined surface 48, and they may have an inclined angle other than the inclined angle α or smaller than the inclined angle β of the side-portion inclined surface 48. Also, the triangular segments 46B, 46C and 46D may not be planar but be composed of curved surfaces. Note that the illustrated steric form of the vertex-portion inclined surface 46 is only an example, and a required inclined surface can be configured by combining segments of appropriate shapes.

In the rectangular cell 40 of this example, the inclined angle α of a part (maximum inclined portion) 46A of the vertex-portion inclined surface 46 is set to be 23.4°, and the inclined angle β of the side-portion inclined surface 48 is set to be 21.5°. The inclined angle of another part 46B of the vertex-portion inclined surface 46 is 18.4°. The height D of the highest point (the vertex A) of the vertex-portion inclined surface 46 is 10.5 mm, and the height F of the highest point (the midpoint B) of the side-portion inclined surface 48 is 7.5 mm. The height C of another part 46B of the vertex-portion inclined surface 46 is 3 mm. The length a of the part 46A of the vertex-portion inclined surface 46 in the direction of the reference surface S is 17.37 mm, and the length b of the side-portion inclined surface 48 in the direction of the reference surface S is 19 mm. The length c of the other part 46B of the vertex-portion inclined surface 46 is 9.03 mm, and one rectangular cell 40 has a substantially square form in plan view with four sides being about 57 mm.

This example is designed for adapting to a surface light source device in which a distance between a substrate surface (a reference surface) on which a light source 2 is implemented and an inner surface of a diffusion member 5 is 11 mm. The results of optical measurement described below were obtained using the illumination device and the surface light source device with such specification.

Note that it has been confirmed that a design adapted to a surface light source device in which a distance between a substrate surface and an inner surface of a diffusion member 5 is 12 min can be achieved by partially modifying the shape of the rectangular cell 40 of this example so that the inclined angle α of the vertex-portion inclined surface 46 is 26.1° and the height D of the highest point (the top portion) is 11.5 mm, making it possible to solve the similar problems.

Figure 10A:
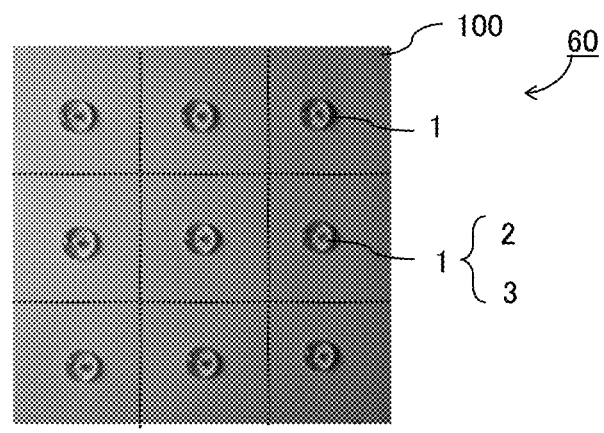
FIG. 10A is a plan photograph of a illumination device including a flat reflection member (comparative example)
Figure 10B:
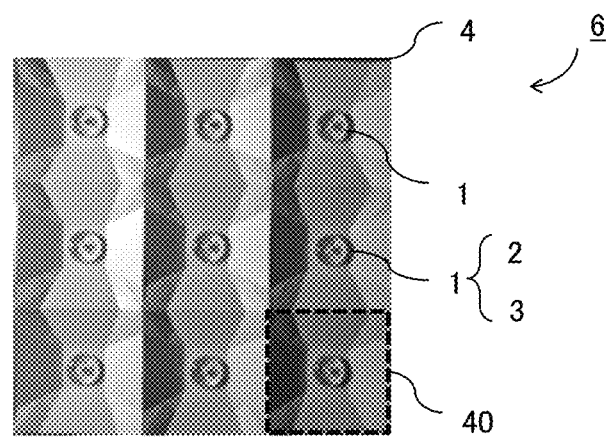
FIG. 10B is a plan photograph of the illumination device including the reflection member shown in FIG. 6 (example)

FIG. 10A is a plan photograph of an illumination device including a flat reflection sheet (comparative example), and FIG. 10B is a plan photograph of the illumination device including the reflection member (the rectangular cell) shown in FIG. 6 (example). The illumination device 60 of the comparative example shown in FIG. 10A is configured for comparison with the illumination device 6 comprising the reflection member 4 of the present invention, and differs from that of FIG. 10B in that the light emitting device 1 is provided on a flat reflection sheet 10, but the configuration, arrangement interval and the like of the light emitting device 1 are the same as that of FIG. 10B. Note that an area (a cell) corresponding to the rectangular cell 40 shown in FIG. 10B is indicated by a dotted line in FIG. 10A for comparison.

Figure 13:
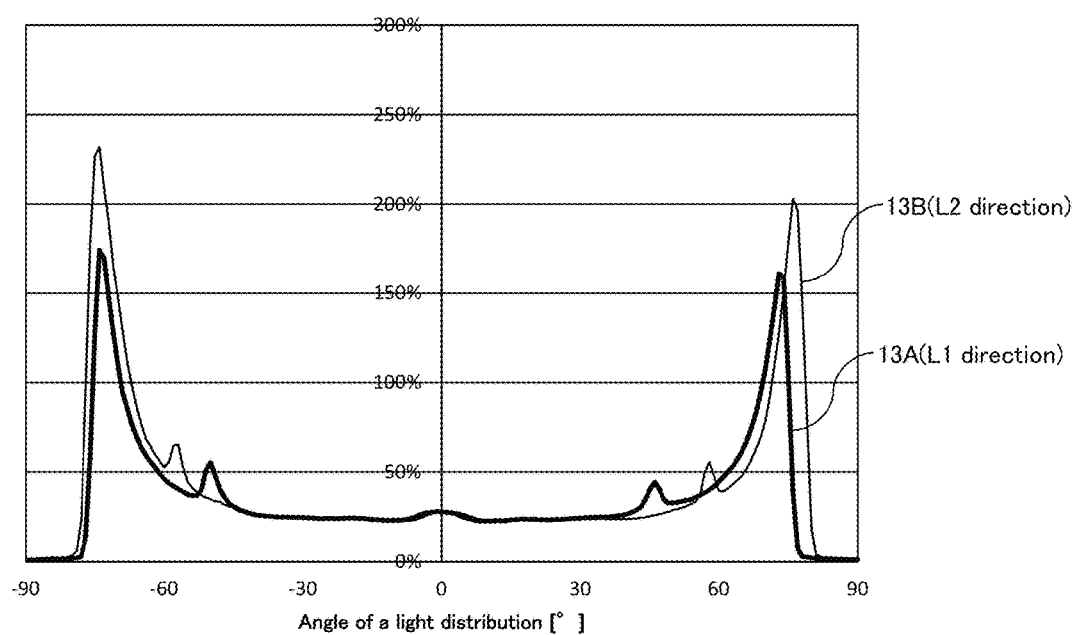
FIG. 13 shows measured values of light distribution curves (directions of first and second baselines) of the illumination device shown in FIG. 10B.

FIG. 11 shows measured values of a light distribution curve of the LED light source 2 used in the illumination device shown in FIGS. 10A and 10B. FIG. 12 shows measured values of a light distribution curve of the light emitting device 1 (the LED light source 2 and the light flux controlling member 3) used in the illumination device shown in FIGS. 10A and 10B. FIG. 13 shows measured values of light distribution curves of a illumination device 6 in which the light emitting device 1 exhibiting the light distribution curve shown in FIG. 12 and the reflection member 4 shown in FIG. 10B are combined. In each of the measurements, the light distribution curve in the cross section along the first baseline L1 and the light distribution curve in the cross section along the second baseline L2 are measured. The lateral axis of FIGS. 11 to 13 indicates measurement results of light intensity at respective emission angles of every one-degree increment from right side 90° to left side 90° when the optical axis direction is supposed to be 0°, and the vertical axis thereof represents the light intensity ratio of the light of every emission angles when the light intensity in the optical axis direction with turning only the LED light source 2 on is supposed to be 100.

The light distribution curve of the LED light source shown in FIG. 11 has a peak in its optical axis direction. On the other hand, the light distribution curve of the light emitting device shown in FIG. 12 has the most intensive peak in the vicinities of ±70° to 80° (10° to 20° with respect to the reference surface) (in FIG. 12, −75° and 78°) because the light irradiated in an oblique direction becomes intense by the function of the light flux controlling member. Note that both the LED light source and the light emitting device radiate a light flux symmetric around its optical axis, so that, in FIGS. 11 and 12, there is almost no difference between the light distribution curve in the cross section along the first baseline L1 and the light distribution curve in the cross section along the second baseline L2, and they are overlapped.

In the light distribution curves of the illumination device 6 of the present invention shown in FIG. 13, in each of measured value 13A in the cross section along the first baseline L1 and measured value 13B in the cross section along the second baseline L2, light intensity between maximum peeks is larger than that of the light distribution curves of the light emitting device shown in FIG. 12. Thus, in the example of the surface light source device of the present invention, the configuration of the vertex-portion inclined surface being inclined more than the side-portion inclined surface improves an effect of the vertex-portion inclined surface for reflecting the light flux received from the light emitting device closer to the Z axis (the optical axis) than the light flux which the side-portion inclined surface receives, making it possible to increase light intensity of light for covering brightness at corners that are likely to be dark in the irradiated area of a polygonal shape.

Figure 14:
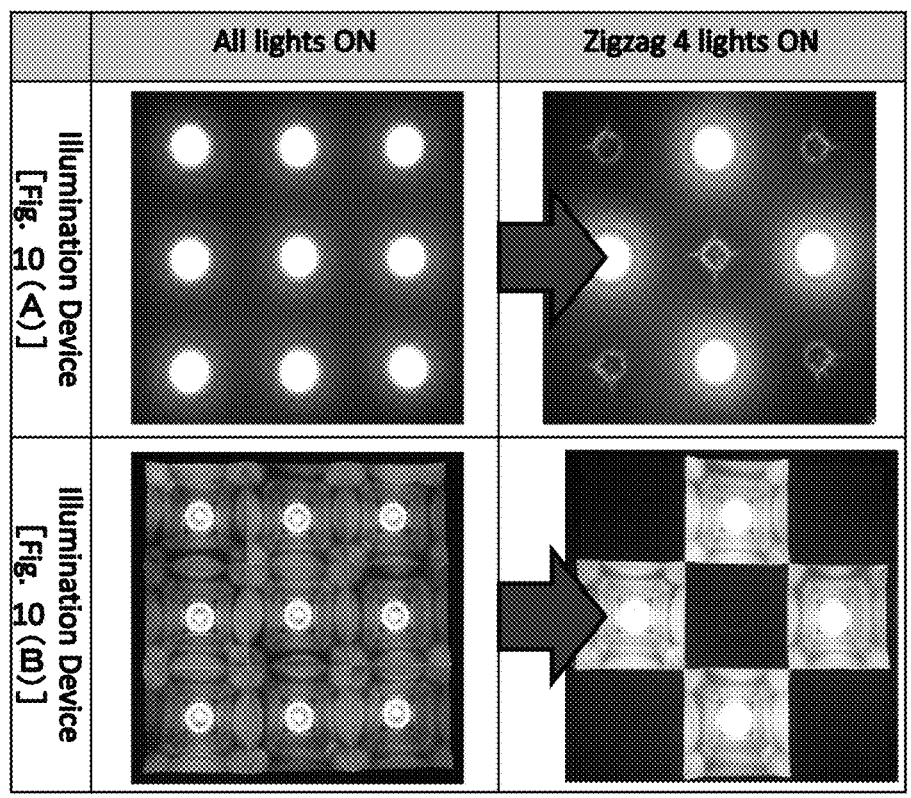
FIG. 14 is a photograph of a lighting state of each illumination device shown in FIGS. 10A and 10B.

FIG. 14 is a photograph of a lighting state of each illumination device shown in FIGS. 10A and 10B. In FIG. 14, two photographs in the upper row show the illumination device 60 including the flat reflection sheet shown in FIG. 10A (on which the light emitting devices 1 are arrayed in matrix manner of three rows and three columns) with turning all the light emitting devices 1 on (left) and with turning the light emitting devices 1 in a zigzag manner (right), respectively. Two photographs in the lower row show the illumination device 6 including the reflection member 4 composed of the rectangular cell 40 of the present invention shown in FIG. 10B (on which the light emitting devices 1 are arrayed in matrix manner of three rows and three columns) with turning all the light emitting devices 1 on (left) and with turning the light emitting devices 1 in a zigzag manner (right), respectively. As apparent from comparison between the photographs of the state of turning on in a zigzag manner (right side in the upper row and right side in the lower row) in FIG. 14, it can be confirmed that a shape of an irradiated area on an irradiated plane is controlled to be substantially the same as a shape of the rectangular cell 40 by the reflection member 4 on which the rectangular cells 40 of the present invention are arrayed.

FIG. 15 is a photograph of a lighting state of the surface light source device in which a diffusion member is arranged on FIG. 14. As apparent from a photograph of the surface light source device of the present invention with turning all the light emitting devices on (left side in the lower low), the surface light source can achieve illumination without unevenness in brightness by arraying the rectangular cells in a matrix manner, and no boundaries between the rectangular cells are visible. Also, as apparent from comparison between the photographs of the state of turning on in a zigzag manner (right side in the upper row and right side in the lower row), it is indicated that an irradiated area of a rectangular shape on each predetermined divided area on an irradiated plane (in this case, a surface of the diffusion member) can be embodied by the reflection member 4 on which the rectangular cells 40 of the present invention are arrayed, making it possible to apply this surface light source device to local dimming control.

Figure 16:
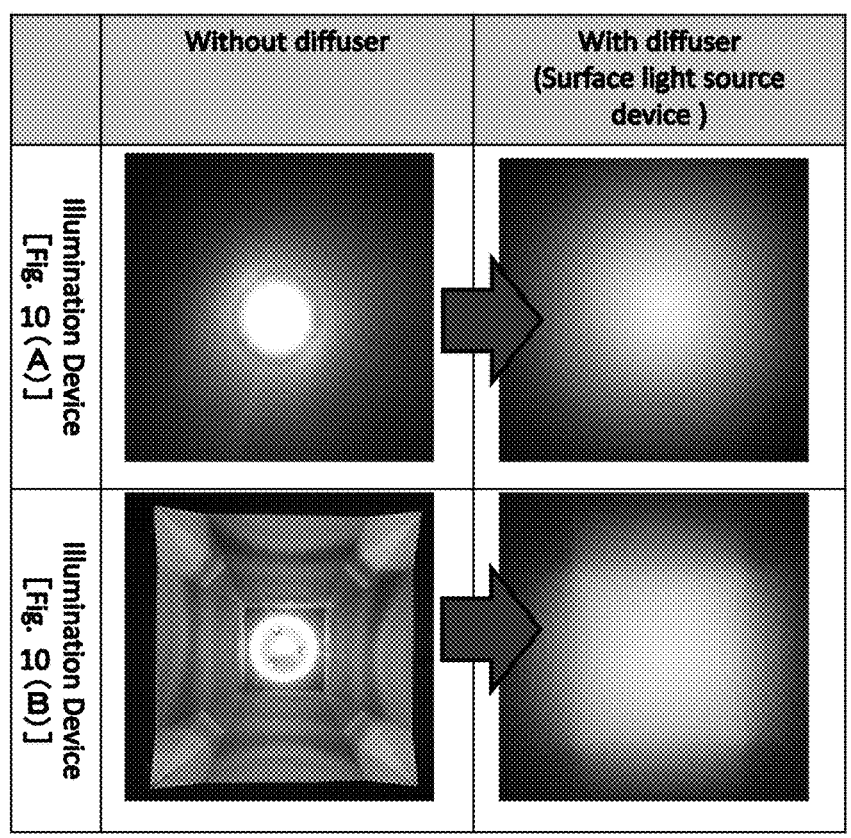
FIG. 16 is photographs of lighting states of each illumination device (single light) shown in FIGS. 10A and 10B, and of each surface light source device comprising each illumination device and a diffusion member.

FIG. 16 includes photographs of a lighting state of one cell on each illumination device shown in FIGS. 1.0A and 10B (left), and photographs of a lighting state of one cell on each surface light source device in which a diffusion member is arranged on the illumination device (right). In FIG. 16, two photographs in the upper row show a lighting state of the illumination device 60 including the flat reflection sheet shown in FIG. 10A (the number of the light emitting device is one), and two photographs in the lower row show a lighting state of the surface light source device including the reflection member 4 configured with the rectangular cell 40 of the present invention shown in FIG. 10B (the number of both the light emitting device 1 and the rectangular cell 40 is one). As apparent from comparison between the photograph on a right side in the upper row and the photograph on a right side in the lower row, it is indicated that the rectangular cell of the present invention can achieve an irradiated area of a relatively precise rectangular shape.

Figure 17:
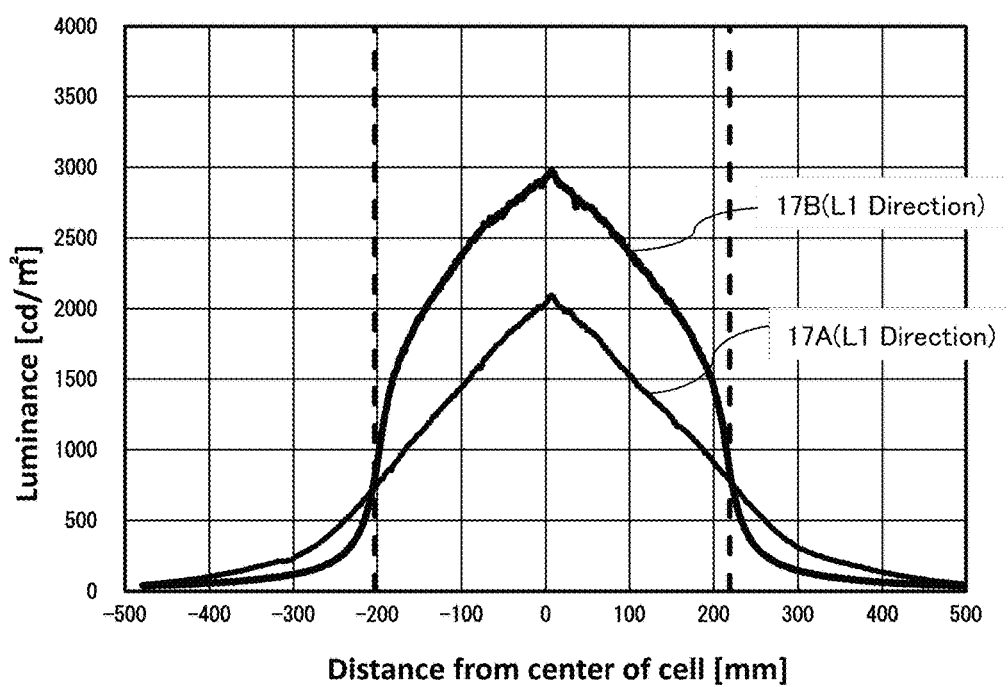
FIG. 17 shows measured values (direction of a first baseline) of luminance distribution of each illumination device (single light) shown in FIGS. 10A and 10B.
Figure 18:
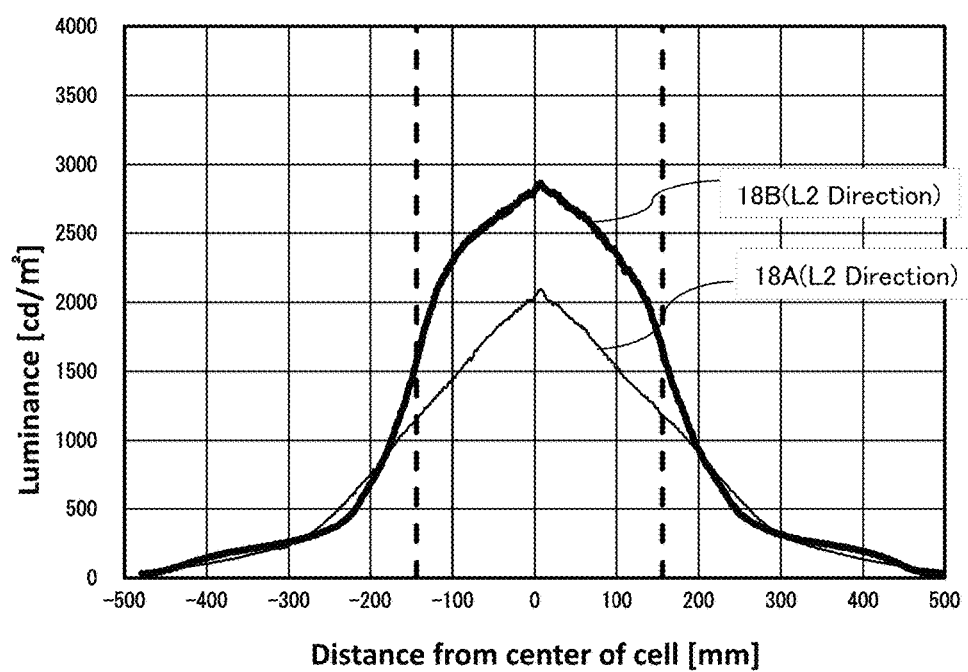
FIG. 18 shows measured values (direction of a second baseline) of luminance distribution of each illumination device (single light) shown in FIGS. 10A and 10B.
Figure 19:
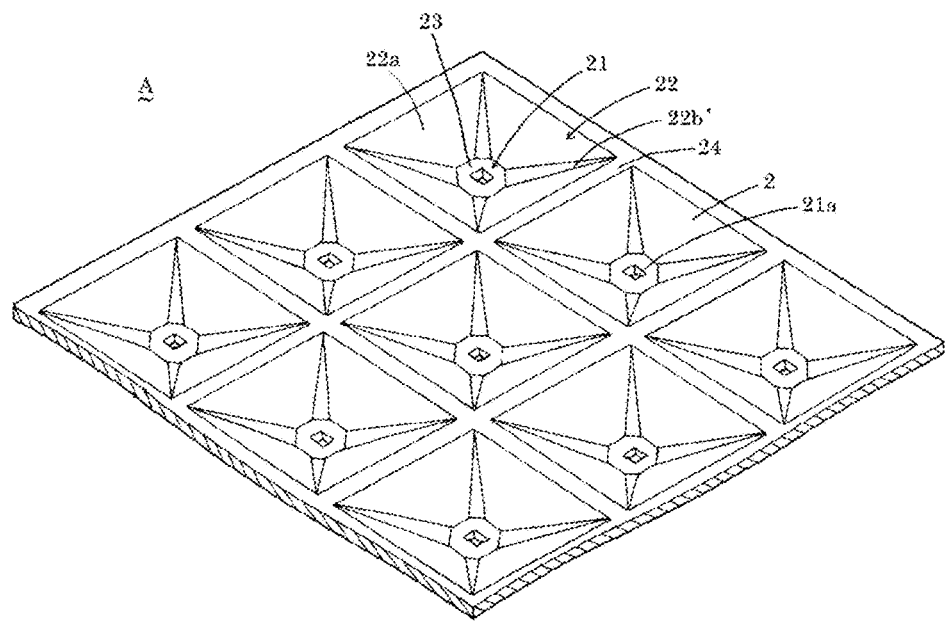
FIG. 19 shows a first conventional example, which is FIG. 8 cited from Patent Literature 1.
Figure 20:
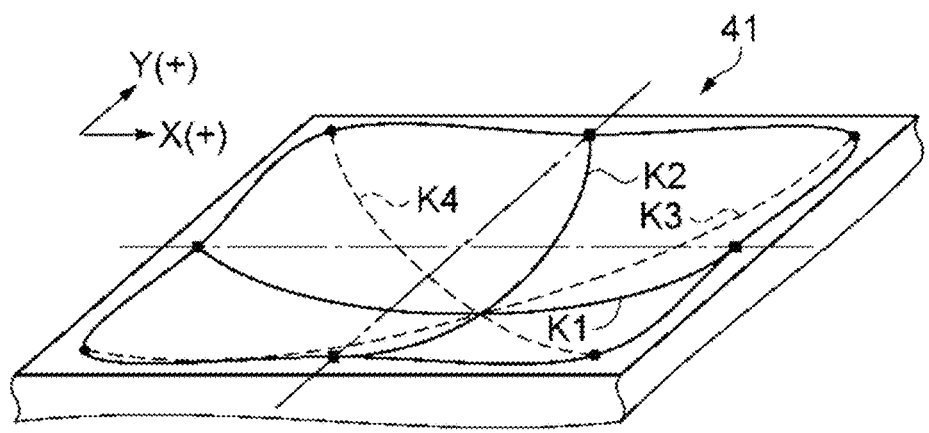
FIG. 20 shows a second conventional example, which is FIG. 7C cited from Patent Literature 2.

FIG. 17 shows measured values of luminance distribution in the direction of the first baseline L1 on the diffusion member 5 of the surface light source devices on the right side in the upper row and the right side in the lower row of FIG. 16 (the surface light source device in which the diffusion member 5 is arranged on one cell of the illumination device (single light emitting device) shown in FIGS. 10A and 10B), and FIG. 18 shows measured values of luminance distribution in the direction of the second baseline L2 on the diffusion member 5 of the same.

Measured values 17A and 18A represent the luminance distribution on the L1 cross section and the L2 cross section, respectively, with the surface light source device including the flat reflection sheet, and measured values 17B and 18B represent the luminance distribution on the L1 cross section and the L2 cross section, respectively, with the surface light source device including the reflection member of the present invention. The dotted lines parallel to the vertical axes shown in FIGS. 17 and 18 correspond to the boundary, i.e., the divided area, between the rectangular cells.

The horizontal axis in FIG. 17 corresponds to a position on a cross section in the direction of the first baseline L1, and the light source is arranged at the position of 0 mm. The horizontal axis in FIG. 18 corresponds to a position on a cross section in the direction of the second baseline L2, and the light source is arranged at the position of 0 mm. The vertical axes in FIGS. 17 and 18 represent luminance [cd/m$^2$] on an irradiated plane arranged at 11 mm in the Z-axis (optical axis) direction apart from a substrate surface on which the LED light source 2 is implemented.

As shown in FIGS. 17 and 18, the surface light source device of the present invention could improve the luminance on the irradiated area (indicated by a boundary of a dotted line in the drawings) compared to a case without using the reflection member of the present invention. Especially, as apparent from FIG. 17, the luminance corresponding to the vicinity of the vertex of the rectangular cell is higher than that in the case without using the reflection member. Furthermore, as apparent from FIGS. 17 and 18, the surface light source device of the present invention can average, to some extent, the luminance in the divided area of the irradiated plane corresponding to the rectangular cell, making it possible to provide illumination having no unevenness in brightness. Also, the boundary between the divided areas could be made clear.

REFERENCE NUMERALS 1 light emitting device
2 light source
3 light flux controlling member
4, 4A, 4B reflection member
5 diffusion member 6 illumination device
7 surface light source device
40, 40A, 40B, 40C polygonal cell (rectangular cell)
42, 42a1, 42a2, 42a3 center bottom portion inclined portion
46, 46a1, 46a2, 46a3 vertex-portion inclined surface
48, 48a1, 48a2, 48a3 side-portion inclined surface
50 irradiated plane

What is claimed is:

1. A reflection member for reflecting light emitted from a light source, comprising:
    at least one polygonal cell of a polygonal shape in plan view, which comprises:
    a center bottom portion orthogonal to an optical axis and configured to receive the light source; and
    an inclined portion inclined from the center bottom portion toward an outer rim;
    wherein the inclined portion has a vertex-portion inclined surface provided correspondingly to each vertex of the polygonal shape, and a side-portion inclined surface provided between two of the vertex-portion inclined surfaces; and
    in cross-sectional view, an acute inclined angle α of at least a part of the vertex-portion inclined surface to a reference plane orthogonal to the optical axis and coplanar with the center bottom portion is larger than an acute inclined angle β of the side-portion inclined surface to the reference plane.

2. The reflection member according to claim 1, wherein: the vertex-portion inclined surface has a plane with the inclined angle α.

3. The reflection member according to claim 1, wherein: the reflection member includes a plurality of the polygonal cells, and an outer rim of each polygonal cell is arranged to be adjacent to each other.

4. The reflection member according to claim 3, wherein the vertex-portion inclined surface has a plane with the inclined angle α.

5. The reflection member according to claim 1, wherein: the highest point of the vertex-portion inclined surface of the polygonal cell is higher than the highest point of the side-portion inclined surface in cross-sectional view.

6. The reflection member according to claim 5, wherein the vertex-portion inclined surface has a plane with the inclined angle α.

7. The reflection member according to claim 5, wherein the reflection member includes a plurality of the polygonal cells, and an outer rim of each polygonal cell is arranged to be adjacent to each other.

8. The reflection member according to claim 7, wherein the vertex-portion inclined surface has a plane with the inclined angle α.

9. An illumination device, comprising:
    a light source; and
    a reflection member for reflecting light emitted from the light source, the reflection member comprising at least one polygonal cell of a polygonal shape in plan view, and the polygonal cell comprises:
    a center bottom portion orthogonal to an optical axis and on which the light source is arranged; and
    an inclined portion inclined from the center bottom portion toward an outer rim, the inclined portion having a vertex-portion inclined surface provided correspondingly to each vertex of the polygonal shape, and a side-portion inclined surface provided between two of the vertex-portion inclined surfaces; and
    wherein, in cross-sectional view, an acute inclined angle α of at least a part of the vertex-portion inclined surface to a reference plane orthogonal to the optical axis and coplanar with the center bottom portion is larger than an acute inclined angle β of the side-portion inclined surface to the reference plane.

10. The illumination device according to claim 9, wherein:
    the highest point of the vertex-portion inclined surface of the polygonal cell is higher than the highest point of the side-portion inclined surface in cross-sectional view.

11. The illumination device according to claim 9, wherein:
    the reflection member includes a plurality of the polygonal cells; and
    an outer rim of each polygonal cell is arranged to be adjacent to each other.

12. A surface light source device, comprising:
    the illumination device according to claim 9; and
    a diffusion member provided on a light emission side of the illumination device.

13. A display device, comprising:
    the surface light source device according to claim 12; and
    an illuminated member which is irradiated with light from the surface light source device.

14. Electronic equipment, comprising the display device according to claim 13 as a display unit.

15. The illumination device according to claim 9, comprising a light flux controlling member for controlling the light emitted from the light source to be a light flux of a predetermined distribution state.

16. The illumination device according to claim 15, wherein the highest point of the vertex-portion inclined surface of the polygonal cell is higher than the highest point of the side-portion inclined surface in cross-sectional view.

17. The illumination device according to claim 15, wherein:
    the predetermined distribution state has a peak in direction of a predetermined angle from a reference surface; and
    the predetermined angle is smaller than the inclined angle β of the side-portion inclined surface.

18. The illumination device according to claim 17, wherein the highest point of the vertex-portion inclined surface of the polygonal cell is higher than the highest point of the side-portion inclined surface in cross-sectional view.

* * * * *